United States Patent
Nygaard et al.

(10) Patent No.: US 12,326,406 B2
(45) Date of Patent: Jun. 10, 2025

(54) INSPECTION SYSTEM FOR MANUFACTURED COMPONENTS

(71) Applicant: General Inspection, LLC, Davisburg, MI (US)

(72) Inventors: Mike Nygaard, Grand Blanc, MI (US); Nathan Kujacznski, Swartz Creek, MI (US); Nadaly Marchi, Holly, MI (US)

(73) Assignee: General Inspection, LLC, Davisburg, MI (US)

( * ) Notice: Subject to any disclaimer, the term of this patent is extended or adjusted under 35 U.S.C. 154(b) by 571 days.

(21) Appl. No.: 17/684,750

(22) Filed: Mar. 2, 2022

(65) Prior Publication Data

US 2023/0280284 A1 Sep. 7, 2023

(51) Int. Cl.
*G01N 21/954* (2006.01)
*G01B 11/24* (2006.01)
*G01N 21/84* (2006.01)

(52) U.S. Cl.
CPC .......... *G01N 21/954* (2013.01); *G01B 11/24* (2013.01); *G01N 2021/845* (2013.01); *G01N 2021/9546* (2013.01); *G01N 2201/0224* (2013.01); *G01N 2201/0636* (2013.01)

(58) Field of Classification Search
CPC .............................. G01N 21/954; G01B 11/24
See application file for complete search history.

(56) References Cited

U.S. PATENT DOCUMENTS

| | | | | |
|---|---|---|---|---|
| 4,967,092 | A * | 10/1990 | Fraignier | G01B 11/12 250/559.22 |
| 7,460,250 | B2 | 12/2008 | Keightley et al. | |
| 8,035,823 | B2 | 10/2011 | Keightley et al. | |
| 9,612,109 | B2 * | 4/2017 | Baba | G02B 5/001 |
| 10,267,725 | B2 | 4/2019 | Keightley et al. | |
| 10,775,315 | B2 * | 9/2020 | Mekala | G01N 21/954 |
| 12,089,817 | B2 * | 9/2024 | Hwang | A61B 1/00105 |

* cited by examiner

*Primary Examiner* — Rebecca C Bryant
(74) *Attorney, Agent, or Firm* — Brooks Kushman P.C.

(57) ABSTRACT

An inspection system configured to scan internal surfaces of manufactured components includes an optical probe, a light source, a conical mirror, and an imaging sensor. The optical probe has a field of view. The light source is spaced apart from the optical probe and is positioned within the field of view of the optical probe. The conical mirror is secured to the light source and is configured to transform light emitted from the light source into a light disc. The light disc is configured to be projected onto the internal surfaces of the manufactured components while scanning the internal surfaces. The imaging sensor is configured to receive reflections of the light disc from the internal surfaces via the optical probe while scanning the internal surfaces.

40 Claims, 10 Drawing Sheets

INSPECTION SYSTEM FOR MANUFACTURED COMPONENTS

TECHNICAL FIELD

The present disclosure relates to inspection systems for manufactured products or components.

BACKGROUND

Inspection systems may be utilized to detect defects in manufactured products during production of such manufactured products.

SUMMARY

An inspection system includes an optical probe, a light source, a conical mirror, an imaging sensor, and a controller. The optical probe has an end and a field of view projecting outward from the end. The light source is spaced apart from the end of optical probe and is positioned within the field of view of the optical probe. The conical mirror is secured to the light source and is configured to transform light emitted from the light source into a light disc. The optical probe, light source, and conical mirror are collectively configured to extend into and retract out of a cavity defined by a manufactured component and collectively rotate within the cavity to scan an internal surface of the manufactured component. The light disc is projected onto the internal surface during the scan. The imaging sensor is configured to receive reflections of the light disc from the internal surface via the optical probe during the scan. The controller is programmed to, (i) extend the optical probe, light source, and conical mirror at a first radial position from a retracted position to a desired depth into the cavity, (ii) rotate the optical probe, light source, and conical mirror at the desired depth from the first radial position to a second radial position, and (iii) retract the optical probe, light source, and conical mirror from the cavity at second radial position during the scan. The controller is further programmed to generate a profile of the internal surface based on the reflections of the light disc from the internal surface received by the imaging sensor during the scan. The controller is further programmed to, in response to the profile being within a tolerable range, direct the manufactured component toward a first direction. The controller is further programmed to, in response to the profile being outside of the tolerable range, direct the manufactured component toward a second direction.

An inspection system configured to scan internal surfaces of manufactured components includes an optical probe, a light source, a bracket, a conical mirror, an imaging sensor, and an actuator. The optical probe has a field of view. The light source is spaced apart from the end of optical probe and is positioned within the field of view of the optical probe. The bracket secures the light source to the optical probe. The bracket partially blocks the internal surfaces of the manufactured components within the field of view while scanning the internal surfaces. The conical mirror is secured to the light source and is configured to transform light emitted from the light source into a light disc. The light disc is configured to be projected onto the internal surfaces of the manufactured components while scanning the internal surfaces. The imaging sensor is configured to receive reflections of the light disc from the internal surfaces via the optical probe while scanning the internal surfaces. The actuator is configured to collectively rotate the optical probe, light source, bracket, and conical mirror about an axis to adjust a radial position of the field of relative to the internal surfaces of the manufactured components while scanning the internal surfaces.

An inspection system configured to scan internal surfaces of manufactured components includes an optical probe, a light source, a conical mirror, and an imaging sensor. The optical probe has a field of view. The light source is spaced apart from the optical probe and is positioned within the field of view of the optical probe. The conical mirror is secured to the light source and is configured to transform light emitted from the light source into a light disc. The light disc is configured to be projected onto the internal surfaces of the manufactured components while scanning the internal surfaces. A distance between the conical mirror and the optical probe is adjustable such that an intersection between the light disc and the internal surfaces of the manufactured components may be adjusted into and of out of the field of view. The imaging sensor is configured to receive reflections of the light disc from the internal surfaces via the optical probe while scanning the internal surfaces.

An inspection system configured to scan internal surfaces of manufactured components includes an optical probe, a light source, a conical mirror, and an imaging sensor. The optical probe has a field of view. The light source is spaced apart from the optical probe and is positioned within the field of view of the optical probe. The conical mirror is secured to the light source and is configured to transform light emitted from the light source into a light disc. The light disc is configured to be projected onto the internal surfaces of the manufactured components while scanning the internal surfaces. A distance between the conical mirror and the light source is adjustable to focus the light disc onto the internal surfaces of the manufactured components. The imaging sensor is configured to receive reflections of the light disc from the internal surfaces via the optical probe while scanning the internal surfaces.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
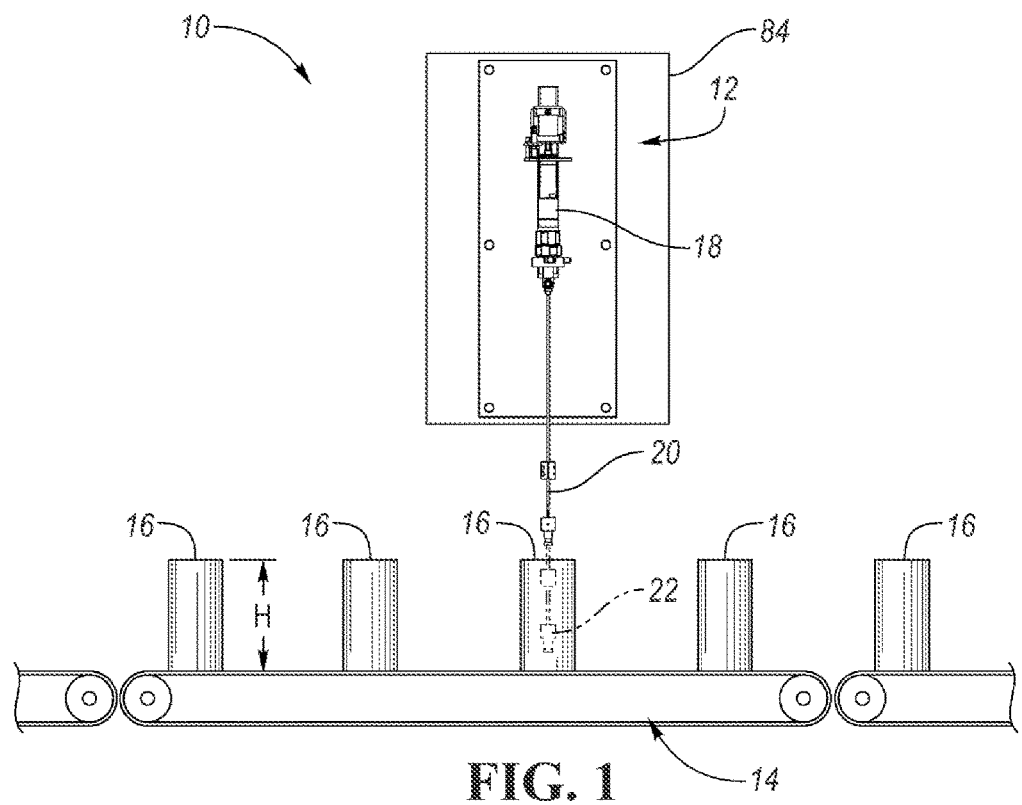
FIG. 1 is a front view of an inspection system having an inspection station and a conveyance system.
Figure 2:
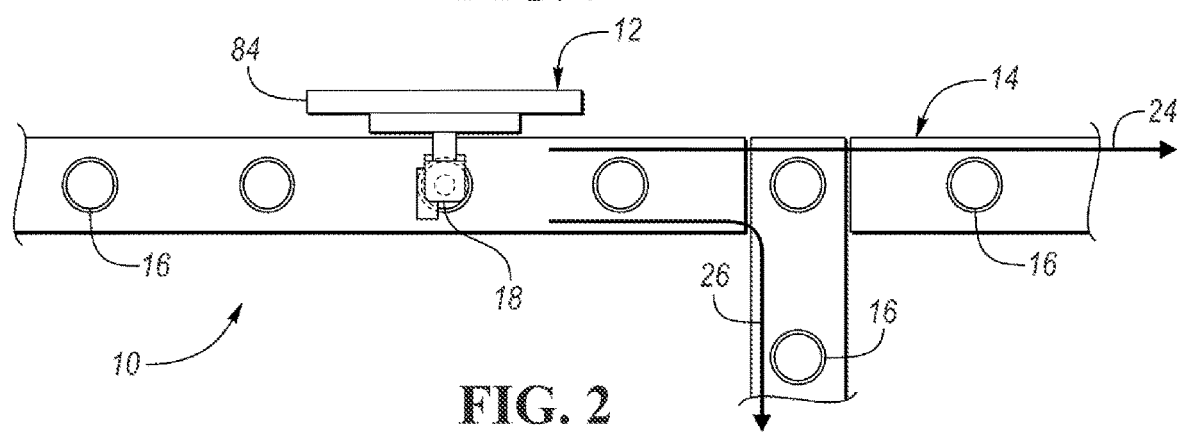
FIG. 2 is a top view of the inspection system.
Figure 3:
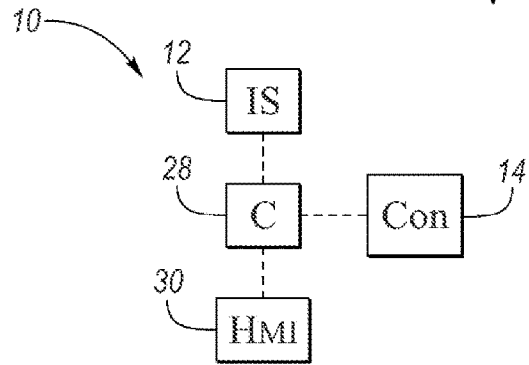
FIG. 3 is diagrammatic view of the inspection system.

Referring to FIGS. 1 and 2, an inspection system 10 is illustrated. The inspection system 10 includes an inspection station 12 and a conveyance system 14. It should be noted that the conveyance system 14 may be any type of conveyance system known to a person of ordinary skill in the art and is not limited to the conveyance system 14 depicted herein. For example, the conveyance system 14 may be a belt conveyor that directly transports manufactured components 16 to and from the inspection station 12, may be a series of rollers that are configured to transport fixtures or pallets that position the manufactured components 16 to and from the inspection station 12, a walking beam, etc.

The inspection station 12 includes an inspection device 18 that is configured to extend into an out of cavities or orifices defined by the manufactured components 16 in order to scan and inspect one or more internal features or internal surfaces of the manufactured components 16. The inspection device 18 is more specifically configured to extend into the cavities or orifices defined by the manufactured components 16 from a retracted position 20 to an advanced position 22 to inspect one or more internal features or internal surfaces of the manufactured components 16. The inspection device 18 then returns the retracted position 20.

The conveyance system 14 is configured to transport the manufactured components 16 to the inspection station 12. The conveyance system 14 may be configured to halt movement of the manufactured components 16 at the inspection station 12 while the manufactured components 16 are being inspected. The conveyance system 14 may further include a nesting mechanism that engages the bottom the manufactured components 16 or engages a pallet carrying the manufactured components 16 to secure a desired location of the manufactured components 16 at the inspection station 12. Alternatively, clamps or some type of a clamping mechanism may engage the manufactured components 16 or engage a pallet carrying the manufactured components 16 to secure a desired location of the manufactured components 16 at the inspection station 12. The conveyance system 14 is then configured to transport the manufactured components 16 away from the inspection station 12 once the manufactured components 16 have been inspected.

The manufactured components 16 may be directed in a first direction 24 if the one or more internal features or internal surfaces of the manufactured components 16 are within a tolerable range and have "passed" the inspection. The manufactured components 16 may be directed in a second direction 26 if the one or more internal features or internal surfaces of the manufactured components 16 are outside of the tolerable range and have "failed" the inspection. Directing the manufactured components 16 in either the first direction 24 or the second direction 26 may include directing the manufactured components 16 to different branches of the conveyance system 14. Directing the manufactured components 16 in the first direction 24 and the second direction 26 does not require the additional conveyor portions as illustrated, but may include a drop floor or chutes that direct the parts toward either an "accepted" bin or "rejected" bin, respectively, may include a robot or pick-and-place that places the parts in an "accepted" bin or "rejected" bin, respectively, or any system that directs the parts toward a packaging station or scrap bin, respectively.

The branch of the conveyance system 14 that corresponds to the manufactured components 16 being directed in the first direction 24 may include directing the manufactured components 16 toward additional steps or processes in the manufacturing process, toward an "accepted" bin that contains parts that "passed" the inspection, or toward a packaging station where the "accepted" parts are packaged and shipped to market or other manufacturing facilities for further processing. The branch of the conveyance system 14 that corresponds to the manufactured components 16 being directed in the second direction 26 may include directing the manufactured components 16 toward an "rejected" bin that contains parts that "failed" the inspection, toward a repair station or loop where the defect in the "rejected" parts is corrected by a tradesman or machine process, or toward a scrap bin where the material of "rejected" parts is recycled for future use.

The inspection system 10 may include a controller 28 that coordinates the operation of the inspection station 12 and conveyance system 14 based on a programmed control logic or algorithms. The control logic or algorithms includes a program that is configured to determine whether or not the one or more internal features or internal surfaces of the manufactured components 16 are within the tolerable range or if there are defects in the internal features or internal surfaces of the manufactured components 16. The features may include any attribute of the manufactured components 16 such as, but not limited to, a desired dimension, geometry (e.g., a geometric shape), or a profile of the manufactured component. For example, a feature may include, but is not limited to, (i) an internal diameter of the manufactured components 16 that defines the cavities or orifices of the manufactured components 16, (ii) the consistency of the internal diameter of the manufactured components 16 along a dimension of the manufactured components 16 (e.g., the controller 28 may determine if a deviation of the internal diameter of the manufactured components 16 is within or outside of a tolerable range along a height, H, of the manufactured components 16), (iii) a profile of the manufactured components 16 along an internal surface of the manufactured components 16 that defines the cavities or orifices of the manufactured components 16 where the profile could have any particular shape, a (iv) the consistency of the profile of the manufactured components 16 along a dimension of the manufactured components 16 (e.g., the controller 28 may determine if a deviation of the profile of the manufactured components 16 is within or outside of a tolerable range along the height, H, of the manufactured components 16), (v) a threaded geometry of the internal surface of the manufactured components 16 that defines the cavities or orifices of the manufactured components 16, (vi) or any other desired shape of the internal surface of the manufactured components 16 that defines the cavities or orifices of the manufactured components 16.

Defects may include any deviation beyond a tolerance from a desired dimension, geometry, or profile, diameter, or any other defect of a manufactured component 16. For example, the defects may include but are limited to, dents, splits, perforations, cracks, scratches, wrinkles, buckles, smudges, surface blemishes, etc. As another example, if the inspection station is being utilized to inspect threaded surfaces, the defect may include a deviation from a desired threading geometry or profile that is greater than a tolerance, or any defect described immediately above (i.e., dents, splits, perforations, cracks, scratches, wrinkles, buckles, smudges, surface blemishes, etc.). In summary, the inspection station 12 may be configured to detect defects including any deviation of a dimension, geometry, or profile that is greater than a tolerance or any of the defects described immediately above (i.e., dents, splits, perforations, cracks, scratches, wrinkles, buckles, smudges, surface blemishes, etc.).

Defect detection may be conducted by running several image processing algorithms within the controller and then analyzing the resultant pixel brightness values. Groups of pixels whose brightness values exceed a preset threshold are flagged as a "bright defect," while groups of pixels whose brightness values lie below a preset threshold are flagged as a "dark defect." Different image processing techniques and threshold values are often needed to inspect for bright and dark defects on the manufactured products or components or within a region of the manufactured products or components. Such imaging techniques to detect defects on manufactured products or components are disclosed in U.S. Pat. No. 9,575,013, the disclosure of which is hereby incorporated in its entirety by reference herein.

The controller 28 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the inspection system 10.

The control strategies and/or logic may be implemented by the controller 28 using one or more processing strategies such as event-driven, interrupt-driven, multi-tasking, multi-threading, and the like. As such, various steps or functions of the control strategies and/or logic may be performed in a desired sequence, in parallel, or in some cases omitted. Although not always explicitly illustrated, one of ordinary skill in the art will recognize that one or more of the steps or functions may be repeatedly performed depending upon the particular processing strategy being used. Similarly, an order of processing is not necessarily required to achieve the features and advantages described herein. The control logic may be implemented primarily in software executed by a microprocessor-based controller, such as controller 28. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the inspection system 10, its subcomponents, or its subsystems. The computer-readable storage devices or media may include one or more of a number of known physical devices which utilize electric, magnetic, and/or optical storage to keep executable instructions and associated calibration information, operating variables, and the like.

The inspection system 10 may include a human machine interface (HMI) 30. The HMI 30 may include an interface that allows an operator or user to operate the inspection system 10. For example, the HMI 30 may include control buttons or a touch screen that allow an operator to initiate automated or manual operation of the inspection system 10 as a whole, the inspection station 12, the conveyance system 14, or any of the subcomponents of the inspection system 10, inspection station 12, or conveyance system 14 further described herein.

A display unit may be a subcomponent of the HMI 30 (e.g., a touchscreen). Alternatively, the display unit may be a separate component from the HMI 30. The display unit may be configured to display whether or not the inspection system 10, the inspection station 12, the conveyance system 14, or any of the subcomponents of the inspection system 10, inspection station 12, or conveyance system 14 are in an "on" or "off" state; the current operating condition of the inspection system 10, the inspection station 12, the conveyance system 14, or any of the subcomponents of the inspection system 10, inspection station 12, or conveyance system 14 (e.g., whether the system or the subcomponents of the system are operating in an automated or manual mode); whether or not there are any faults within the inspection system 10, the inspection station 12, the conveyance system 14, or any of the subcomponents of the inspection system 10, inspection station 12, or conveyance system 14 (e.g., a manufactured component is jamming the inspection station 12 or conveyance system 14; one or more of the sensors described herein are not communicating with the controller 28; any of the other components are not communicating with the controller 28; etc.); whether or not a "passed parts" bin or a "failed or rejected parts" bin is full; etc.

The inspection system 10, the inspection station 12, the conveyance system 14, and any of the subcomponents of the inspection system 10, inspection station 12, or conveyance system 14 may be wired to receive electrical power and to communicate with the controller 28 and other components of the system. However, for ease of illustration, the power cables that connect the system to a power grid or other source and any various commination wires have been omitted.

Figure 4:
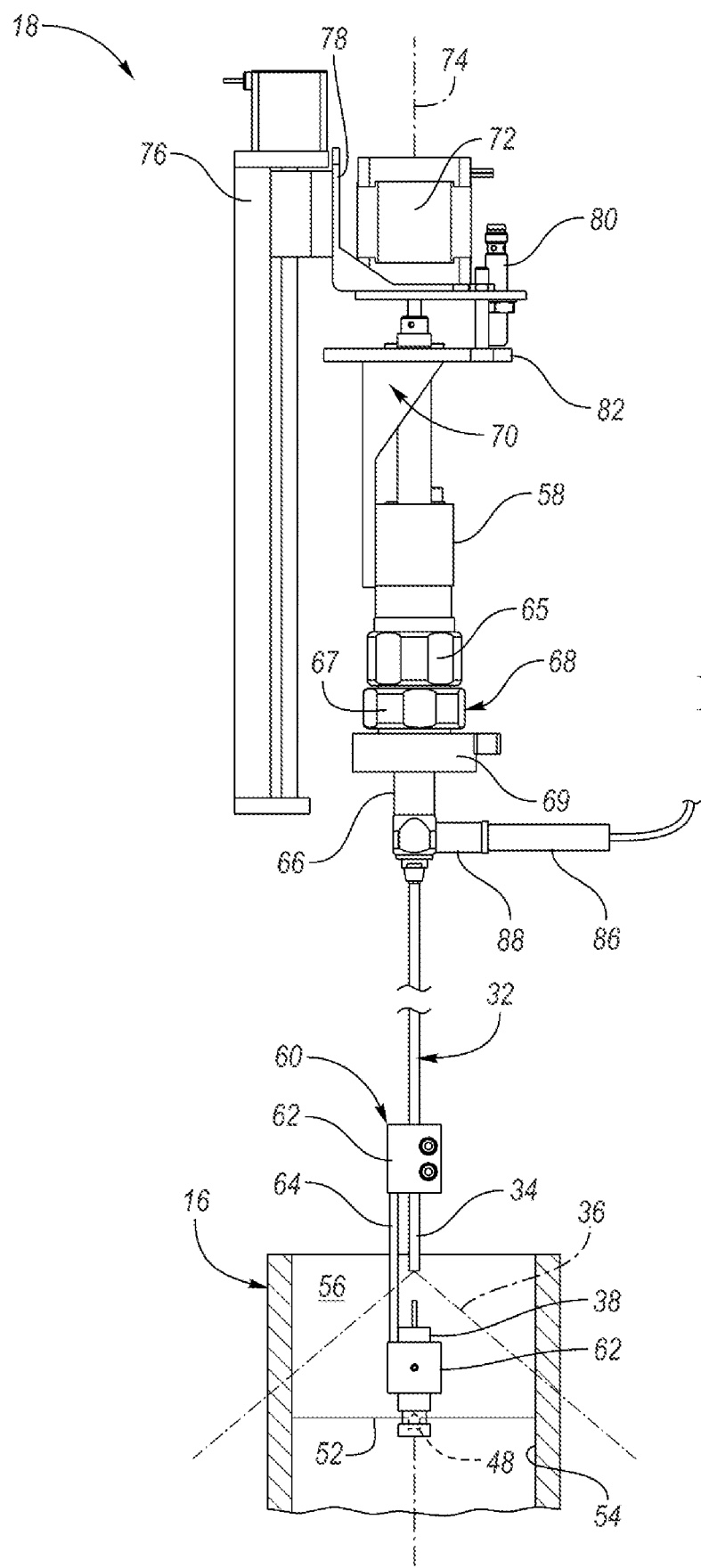
FIG. 4 is a front isometric view of a first embodiment of an inspection device utilized by the inspection station.
Figure 5:
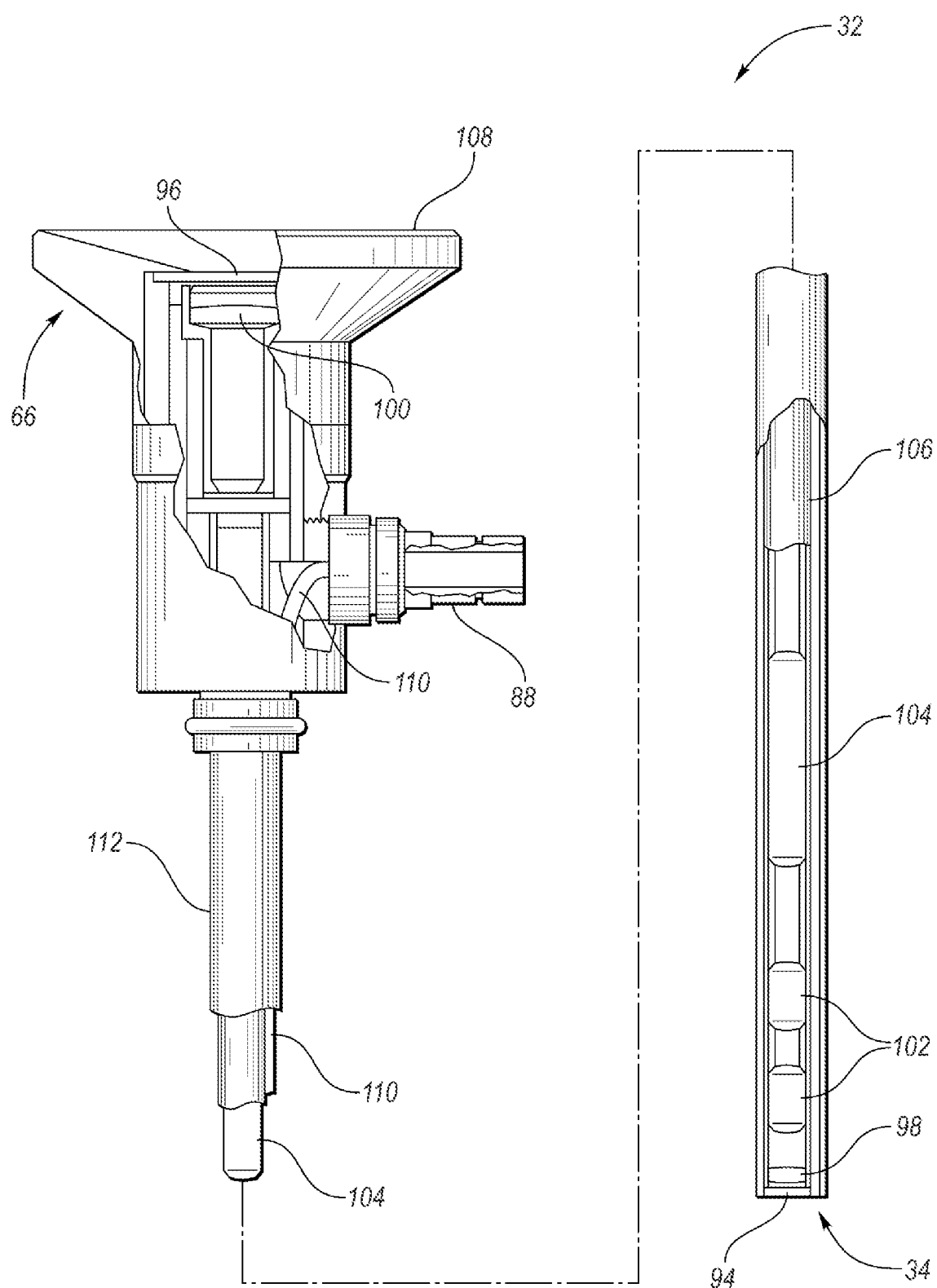
FIG. 5 is a diagrammatic view of an optical probe or endoscope.
Figure 6:
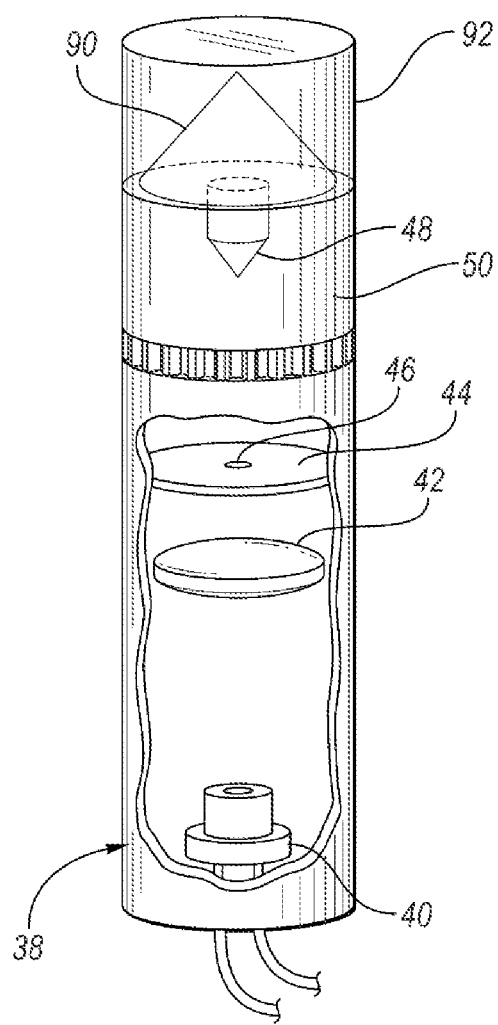
FIG. 6 is a front isometric view of a light projecting system for the inspection device.
Figure 7:
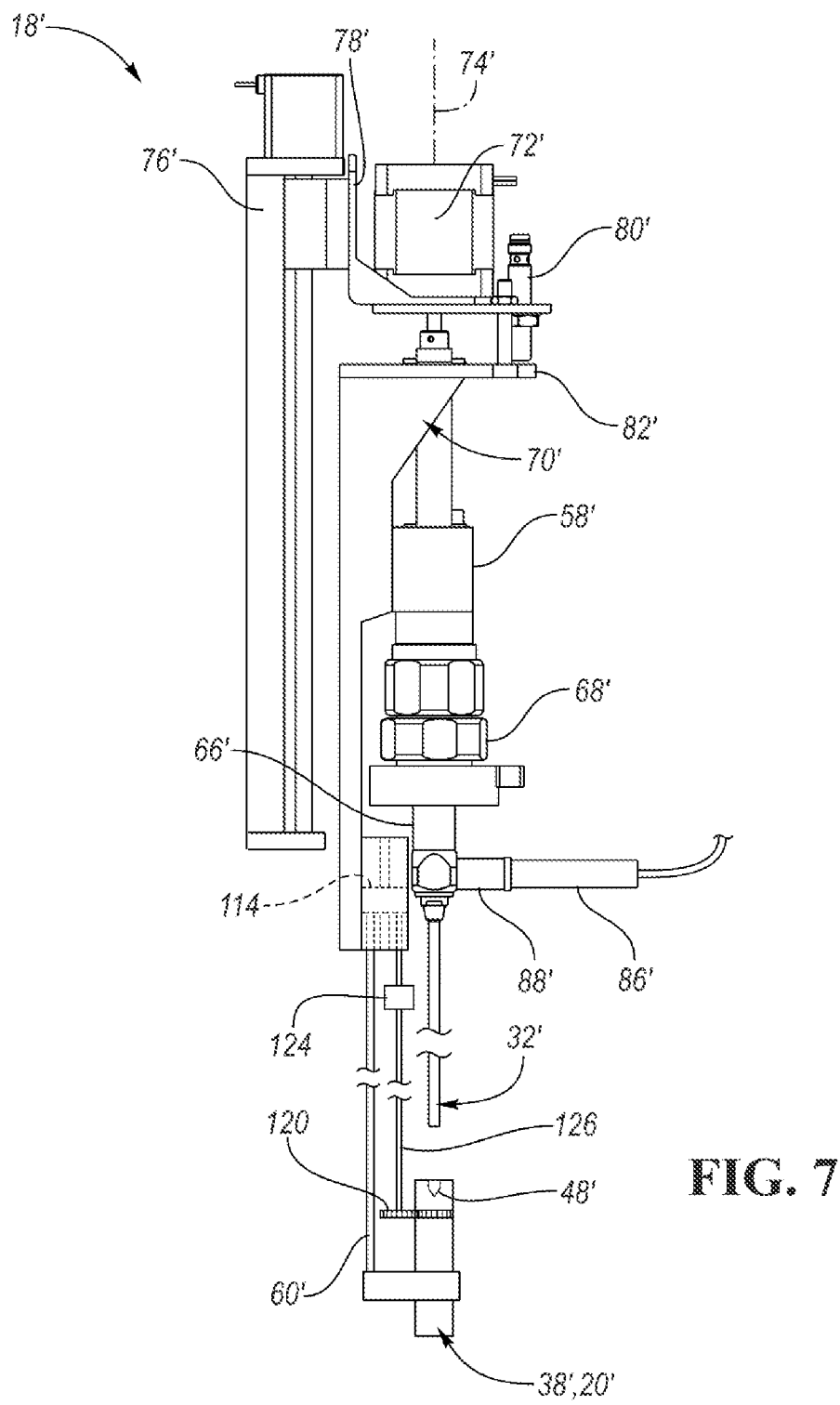
FIG. 7 is a front isometric view of a second embodiment of the inspection device.
Figure 8:
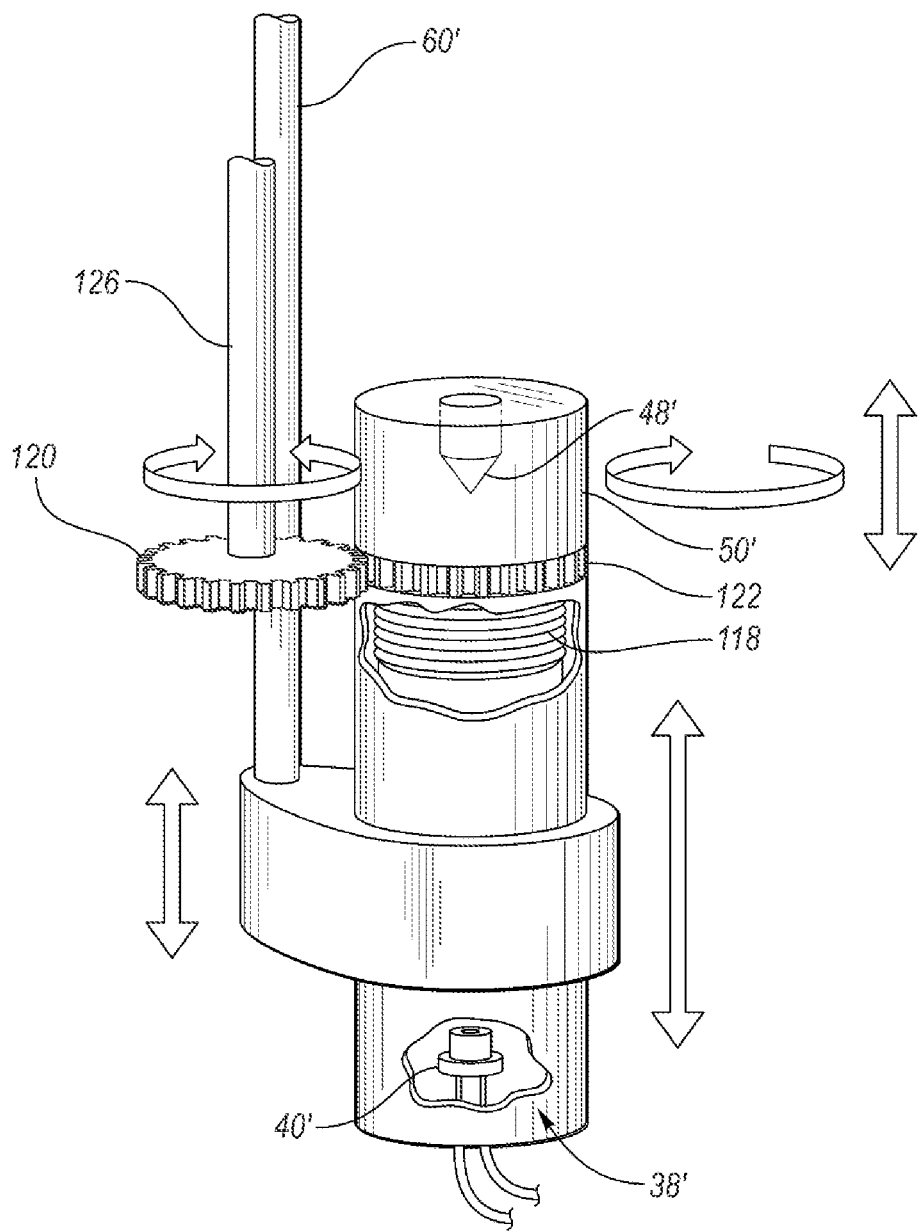
FIG. 8 is a front isometric view of the light projecting system with an adjustment mechanism for the light projecting system.

Referring to FIGS. 4-6, the inspection device 18 and the various subcomponents of the inspection device 18 are illustrated in further detail. The inspection device 18 includes an endoscope or optical probe 32. The optical probe 32 has a distal end 34 and a field of view 36 projecting outward from the distal end 34. The inspection device 18 includes a light source 38 that is spaced apart from the distal end 34 of optical probe 32 and positioned within the field of view 36 of the optical probe 32. More specifically, the light source 38 may be a laser light source that includes a laser diode 40 and a collimating lens 42. The light source 38 may also include a plate 44 defining a pinhole 46. The light source is configured to direct a beam of light (e.g., laser light) onto a conical mirror 48 that may be secured within a transparent housing 50. The conical mirror 48 may be secured to the light source 38. More specifically, the conical mirror 48 may be secured to the light source 38 via the transparent housing 50.

The conical mirror 48 is configured to transform the light emitted from the light source 38 into a light disc 52 that is projected outward in all directions along a plane and onto internal surfaces 54 of the manufactured components 16. The plane along which the light disc 52 is projected may extend outward in a substantially horizontal direction. Substantially horizontal may include any incremental angle between exactly horizontal and 15° from exactly horizontal. Please note the manufactured component 16 depicted in FIG. 4 is shown in cross-section for illustrative purposes. The intersection between the light disc 52 and the internal surfaces 54 of the manufactured components 16 needs be within the field of view 36 of the optical probe 32 during scans or inspections of the internal surfaces 54 of the manufactured components 16. The optical probe 32, light source 38, and conical mirror 48 are collectively configured to extend into and retract out of the cavities or orifices 56 defined by the manufactured components 16 between the advanced position 22 and the retracted position 20 during scans or inspections of the internal surfaces 54 of the manufactured components 16. The inspection device 18 further includes a vision or imaging sensor 58 configured to receive reflections of the light disc 52 from the internal surfaces 54 of the manufactured components 16 via the optical probe 32 during scans or inspections of the internal surfaces 54 of the manufactured components 16.

The light source 38 is secured to the distal end 34 of the optical probe 32 via an adapter such as a brace or bracket 60. The bracket 60 may comprises a pair of cuffs 62 that are spaced apart by a linking rod or linking bar 64. The distance between the cuffs 62 is adjustable so that the position of the of the light disc 52 within the field of view 36 may be adjusted. The bracket 60 (or more specifically the linking bar 64) and any power or communication cables wires that are routed to the light source 38 along the bracket 60 (or more specifically the linking bar 64) may partially block the internal surfaces 54 of the manufactured components 16 within the field of view 36 during scans or inspections of the internal surfaces 54 of the manufactured components 16. A proximal end 66 of the optical probe 32 may be secured to the imaging sensor 58 via an adapter 68. The adapter 68 may comprise an aperture 65 to adjust the amount of light allowed into the optical probe 32, a focus adjustment 67, and a locking ring 69 to secure the position of the optical probe 32. More specially, the adapter may engage the eyepiece portion 108 of the optical probe to secure the position of the optical probe 32.

The optical probe 32, light source 38, imaging sensor 58, bracket 60, and adapter 68 may all be directly or indirectly affixed to a bracket 70 that is connect to an actuator, such as rotational motor 72. The rotational motor 72 may be a servo motor. The optical probe 32, light source 38, imaging sensor 58, bracket 60, adapter 68, and bracket 70 are configured to collectively rotate about a common axis 74. The axis 74 may extend in a substantially vertical direction. Substantially vertical may include any incremental angle between exactly vertical and 15° from exactly vertical. More specifically, the rotational motor 72 is configured to collectively rotate the optical probe 32, light source 38, imaging sensor 58, bracket 60, adapter 68, and bracket 70 about the axis 74 to adjust a radial position of the field of view 36 of the optical probe 32 relative to the internal surfaces 54 of the manufactured components 16 during scans or inspections of the internal surfaces 54 of the manufactured components 16. Even more specifically, the rotational motor 72 is configured to collectively rotate the optical probe 32, light source 38, imaging sensor 58, bracket 60, adapter 68, and bracket 70 about the axis 74 from a first radial position to second radial position during scans or inspections of the internal surfaces 54 of the manufactured components 16.

The rotational motor 72 is secured to a linear motion slide 76 via bracket 78. A proximity sensor 80 is also secured to bracket 78. The proximity sensor 80 is configured to detect a protrusion 82 extending from bracket 70 to determine if the optical probe 32, light source 38, imaging sensor 58, bracket 60, adapter 68, and bracket 70 are in the first or second radial position. The proximity sensor 80 detecting the protrusion 82 may indicate that the optical probe 32, light source 38, imaging sensor 58, bracket 60, adapter 68, and bracket 70 are in the first radial position while the proximity sensor 80 not detecting the protrusion 82 may indicate that the optical probe 32, light source 38, imaging sensor 58, bracket 60, adapter 68, and bracket 70 are in the second radial position, or vice versa. The proximity sensor 80 is configured to communicate the radial position (e.g., the first or second radial position) to the controller 28. The linear motion slide 76 is configured to collectively extend and retract the optical probe 32, light source 38, conical mirror 48, imaging sensor 58, bracket 60, adapter 68, bracket 70, rotational motor 72, bracket 78, and proximity sensor 80 along the axis 74. More specifically, the linear motion slide 76 is configured to collectively extend and retract the optical probe 32, light source 38, and conical mirror 48 into and out of the cavities or orifices 56 defined by the manufactured components 16 between the advanced position 22 and the retracted position 20 during scans or inspections of the internal surfaces 54 of the manufactured components 16.

The linear motion slide 76 may be any type of linear motion device that is driven by an actuator. For example, the linear motion device may be a ball screw and ball nut combination, a bearing block and rail combination, etc., while the actuator driving the linear motion device may be a servo motor, a pneumatic cylinder, a hydraulic cylinder, an electric solenoid etc. The linear motion slide 76 may then be secured to a frame or framework 84 of the inspection station 12 (See FIGS. 1-2).

Alternatively, the inspection device 18 may secured to a robot or robot arm that is part of the inspection station 12 and configured to extend the optical probe 32, light source 38, and conical mirror 48 into and retract the optical probe 32, light source 38, and conical mirror 48 out of the cavities or orifices 56 defined by the manufactured components 16. The robot may be a six-axis robot, a robot arm having any number of axes, or any type or robot. If the inspection device 18 is secured to a robot or robot arm, the motion of the inspection device 18 into an out of the cavities or orifices 56 defined by the manufactured components 16 may be in any direction along any orientation and is not limited to the up and down motion illustrated herein.

The optical probe 32 may include a second light source 86 that is configured to illuminate the field of view 36. The second light source 86 may be a non-laser light source, including, but not limited to incandescent lights, halogen lights, light emitting diodes, fluorescent lights, etc. The second light source 86 may be secured to a port 88 on the optical probe 32 and optical guides within the optical probe 32 may be configured to direct the light emitted from the second light source 86, to the distal end 34 of optical probe 32, and out into the field of view 36 in order to illuminate the field of view 36 and the internal surfaces 54 of the manufactured components 16 during scans or inspections of the internal surfaces 54 of the manufactured components 16. A second conical mirror 90 may utilized to concentrate the light from the second light source 86 onto the internal surfaces 54 of the manufactured components 16. The second conical mirror 90 may be disposed within a second transparent housing 92 and may be disposed on top of the transparent housing 50 containing conical mirror 48 such the pointed end of the second conical mirror 90 faces the distal end 34 of the optical probe 32.

The second conical mirror 90 is illustrated as being secured to the transparent housing 50 containing the conical mirror 48 in FIG. 6. It is noted that FIG. 6 shows an alternative position where the conical mirror 48 and the transparent housing 50 are positioned on top of the light source 38 as opposed to the configuration in FIG. 4 where the light source 38 is positioned on top of the conical mirror 48 and transparent housing 50. It is noted that either configuration is acceptable as long as the intersection between the light disc 52 and the internal surfaces 54 of the manufactured components 16 is within the field of view 36 of the optical probe 32.

The optical probe 32 may include a first window 94 at the distal end 34 and a second window 96 at the proximal end 66. The optical probe 32 may include negative lens 98 at the distal end 34 and an ocular or eyepiece lens 100 at the proximal end 66. Objective lenses 102 and relay lenses 104 may be disposed between the negative lens 98 and the eyepiece lens 100. The negative lens 98, objective lenses 102, and relay lens 104 may be disposed within an optical carrier tube 106. The second window 96 and eyepiece lens 100 may be disposed within an eyepiece portion 108. A fiber optic or illumination fiber 110 may extend from the port 88 to the distal end 34 to transport light from the second light source 86 to the distal end 34 and into the field of view 36. The optical carrier tube 106 and the illumination fiber 110 may be housed within an outer tube 112.

Referring to FIGS. 7-10C, an alternative embodiment of inspection device 18' is illustrated. It should be understood that inspection device 18' has all the same subcomponents and functionality as inspection device 18 unless otherwise stated or illustrated herein. Furthermore, it should be understood that any component having a callout number in FIGS. 7-10 that includes a prime symbol (') should be construed as having the same structure, subcomponents, and functionality as a component illustrated in FIGS. 1-6 that includes the same callout number but without the prime symbol, unless otherwise stated or illustrated herein.

The inspection device 18' includes an optical probe 32' having a distal end 34' and a proximal end 66'. The optical probe 32' has a field of view 36' projecting outward from the distal end 34'. The inspection device 18' also includes a light source 38', a conical mirror 48', a transparent housing 50', an imaging sensor 58', an adapter 68', a bracket 70', a rotational motor 72', a linear motion slide 76', a bracket 78', and a proximity sensor 80'. The optical probe 32' may also include a port 88' and a second light source 86' may be secured to a port 88'.

The conical mirror 48' is configured to transform the light emitted from the light source 38' into a light disc 52' that is projected outward in all directions along a plane, which is projected onto internal surfaces 54 of the manufactured components 16 in order to inspect the in internal surfaces 54. The intersection between the light disc 52' and the internal surfaces 54 of the manufactured components 16 needs be within the field of view 36' of the optical probe 32' during scans or inspections of the internal surfaces 54 of the manufactured components 16. The optical probe 32', light source 38', and conical mirror 48' are collectively configured to extend into and retract out of the cavities or orifices 56 defined by the manufactured components 16 between an advanced position 22' and a retracted position 20' during scans or inspections of the internal surfaces 54 of the manufactured components 16. The vision or imaging sensor 58' is configured to receive reflections of the light disc 52' from the internal surfaces 54 of the manufactured components 16 via the optical probe 32' during scans or inspections of the internal surfaces 54 of the manufactured components 16.

The optical probe 32', light source 38', imaging sensor 58', bracket 60', adapter 68', and bracket 70' are configured to collectively rotate about a common axis 74'. The proximity sensor 80' is configured to detect a protrusion 82' extending from bracket 70' to determine if the optical probe 32', light source 38', imaging sensor 58', bracket 60', adapter 68', and bracket 70' are in a first or second radial position.

The linear motion slide 76' may be secured to the frame or framework 84 of the inspection station 12. Alternatively, the inspection device 18' may secured to a robot or robot arm that is part of the inspection station 12 and configured to extend the optical probe 32', light source 38', and conical mirror 48' into and retract the optical probe 32', light source 38', and conical mirror 48' out of the cavities or orifices 56 defined by the manufactured components 16. The robot may be a six-axis robot, a robot arm having any number of axes, or any type or robot. If the inspection device 18' is secured to a robot or robot arm, the motion of the inspection device 18' into an out of the cavities or orifices 56 defined by the manufactured components 16 may be in any direction along any orientation and is not limited to the up and down motion illustrated herein.

The collective position the light source 38', conical mirror 48', and transparent housing 50' are adjustable relative to the optical probe 32'. More specifically, a bracket 60' secures the light source 38', conical mirror 48', and transparent housing 50' to an actuator 114. The actuator 114 may any type actuator, such as a servo motor, that is part of a linear motion device such a ball screw and ball nut combination, a bearing block and rail combination, etc. The actuator 114 is secured to bracket 70' and is configured to adjust a linear position of the bracket 60', the light source 38', the conical mirror 48', and the transparent housing 50' to adjust a distance between the conical mirror 48' and the optical probe 32'. More specifically, the intersection between the light disc 52' and the internal surfaces 54 of the manufactured components 16 may be adjusted into and of out of the field of view 36'. Such an adjustment may be desirable if an internal dimension (e.g., an internal diameter) of the manufactured components 16 in not the same for each manufactured component 16.

Figure 9A:
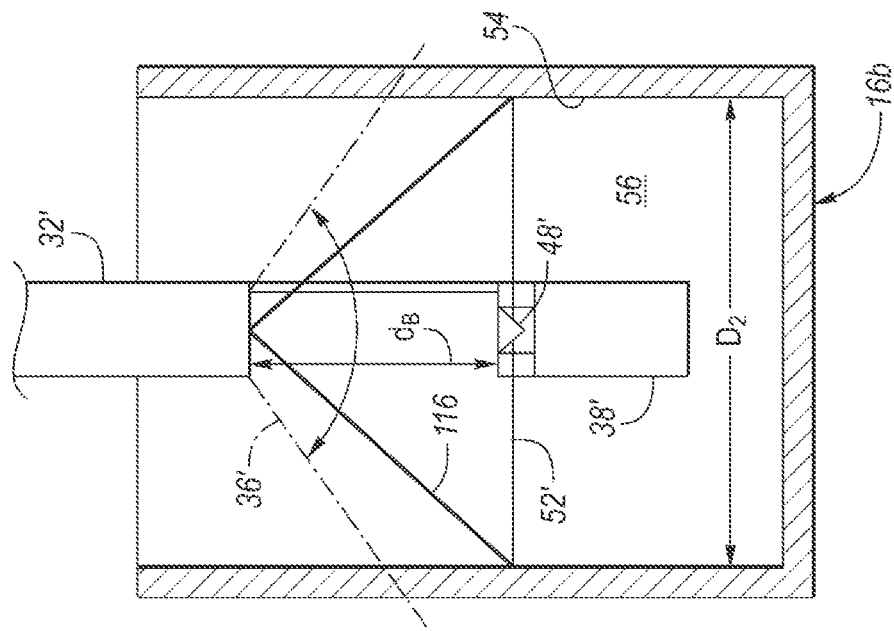
FIGS. 9A-9C are diagrammatic views illustrating a first type of adjustment for the light projecting system.
Figure 9B:
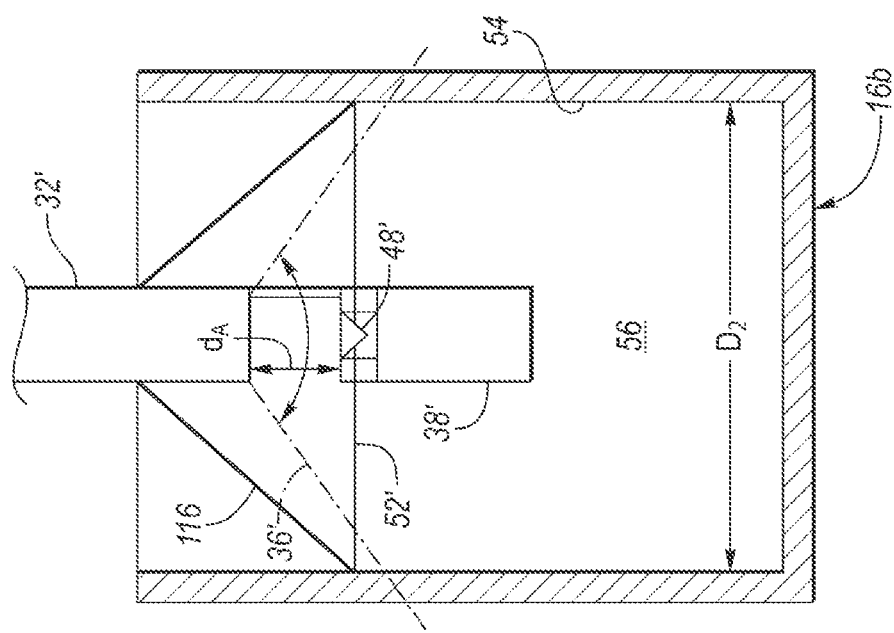
Figure 9C:
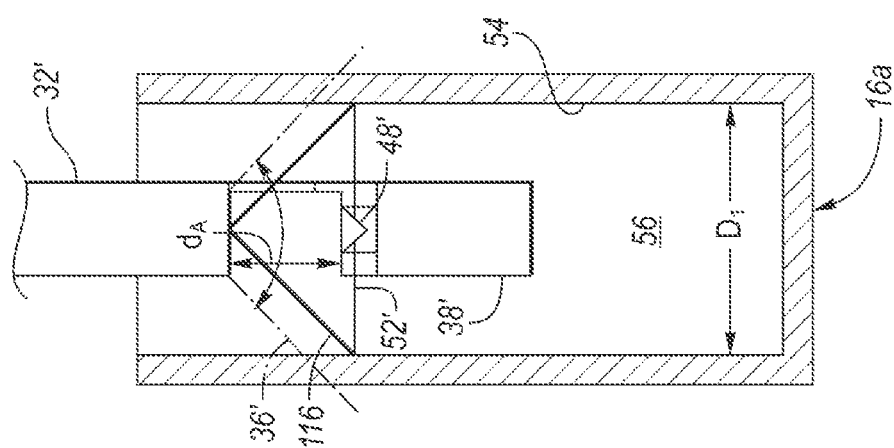

For example, in FIG. 9A, a first manufactured component 16a is being in inspected via the inspection device 18'. The distance between the conical mirror 48' and the optical probe 32' is set at a first value, $d_A$, the internal diameter of the first manufactured component 16a is $D_1$, and the light disc 52' is shown to be within the field of view 36' of the optical probe 32'. After the first manufactured component 16a has been inspected, a second manufactured component 16b having an internal diameter is $D_2$, which is larger than internal diameter $D_1$, is then inspected via the inspection device 18'. However, the light disc 52' is shown to be outside of the field of view 36' of the optical probe 32' while the distance between the conical mirror 48' and the optical probe 32' is set at the first value, $d_A$, which is shown in FIG. 9B. Also illustrated in FIG. 9B, the reflection 116 of the light disc 52' extends beyond the end of the to the optical probe 32' and is therefore not detected by the optics of the optical probe 32'. To properly inspect the internal surface 54 of the second manufactured component 16b, the distance between the conical mirror 48' and the optical probe 32' is adjusted (e.g., increased) to a second value, dB, in FIG. 9C, so that the light disc 52' is within the field of view 36' of the optical probe 32' and so that the reflection 116 of the light disc 52' from the internal surface 54 is directed to the end optical probe 32' where the optics of the optical probe 32' are able to detect the reflection 116 of the light disc 52'. It should be understood, the distance between the conical mirror 48' and the optical probe 32' may be adjusted by any incremental value to inspect a multitude of manufactured components having internal diameters or profiles of any size and is not limited to the two positions illustrated in FIGS. 9A-9C.

The position of the conical mirror 48' relative to the light source 38' is also adjustable. The transparent housing 50' may include a threaded portion 118 that engages a tapped hole defined by the housing of the light source 38'. Threading the transparent housing 50' into the tapped hole defined by the housing of the light source 38' decreases a distance between the conical mirror 48' and the light source 38', or more specifically decreases a distance between the conical mirror 48' and a laser diode 40' of the light source 38'. Threading the transparent housing 50' out of the tapped hole defined by the housing of the light source 38' increases a distance between the conical mirror 48' and the light source 38', or more specifically increases a distance between the conical mirror 48' and the laser diode 40' of the light source 38'.

A gear 120 may engage teeth 122 on the transparent housing 50' in order to thread the transparent housing 50' into an out of the tapped hole defined by the housing of the light source 38'. An actuator 124 may be secured to a shaft 126 that turns the gear 120. The actuator 124 may be a motor, such as a servo motor. The gear 120, actuator 124, and shaft 126 may also be secured to actuator 114 so that the gear 120, actuator 124, and shaft 126 collectively move linearly along with the bracket 60', the light source 38', the conical mirror 48', and the transparent housing 50'.

The distance between the conical mirror 48' and the light source 38' (or more specifically the distance between the conical mirror 48' and the laser diode 40' of the light source 38') is adjustable so that the light disc 52' may be focused onto the internal surface 54 of the manufactured components 16.

Figure 10C:
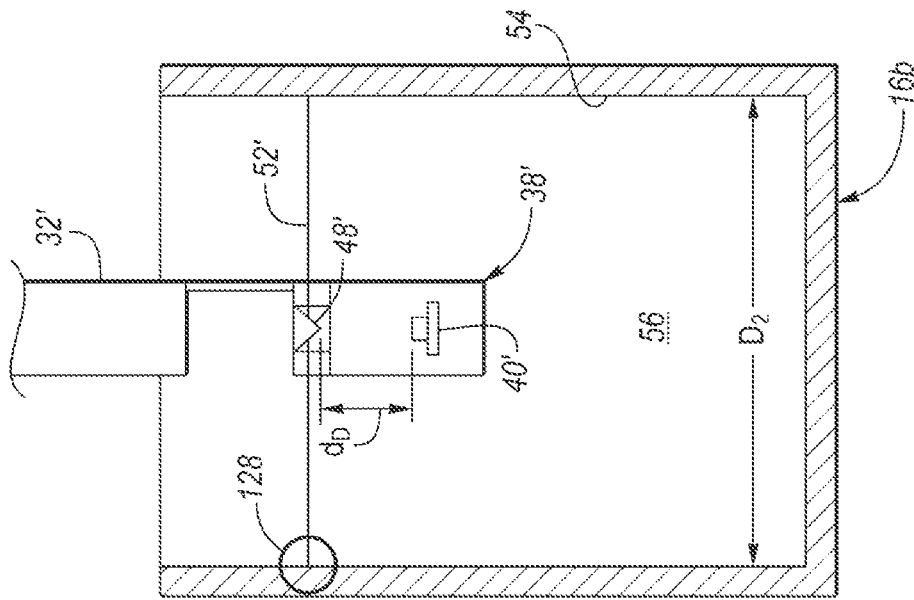
FIGS. 10A-10C are diagrammatic views illustrating a second type of adjustment for the light projecting system.
Figure 10B:
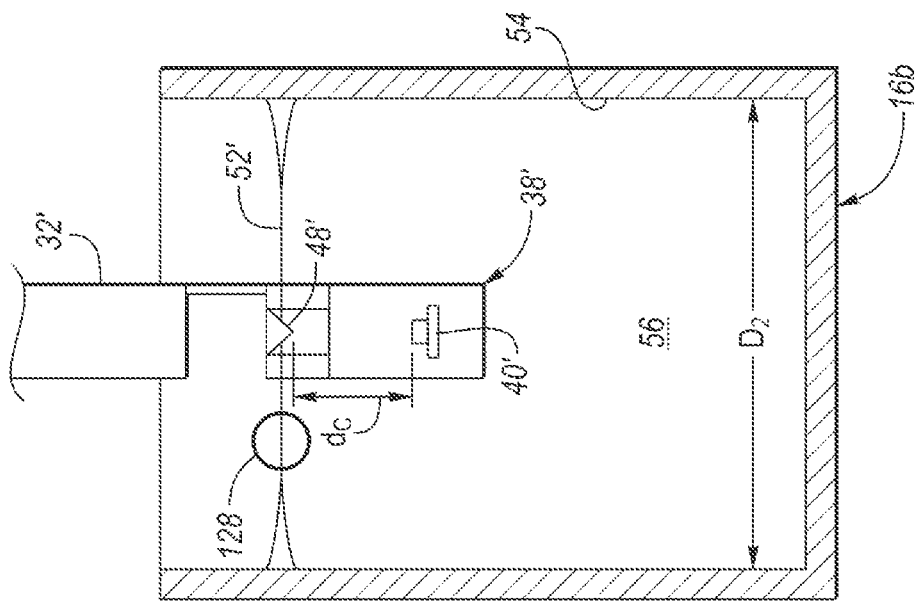
Figure 10A:
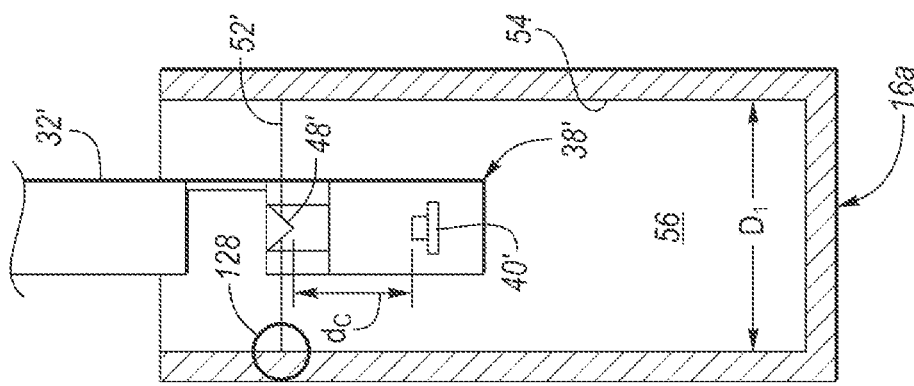

For example, in FIG. 10A, the first manufactured component 16a is being in inspected via the inspection device 18'. The distance between the conical mirror 48' and the light source 38' (or more specifically the distance between the conical mirror 48' and the laser diode 40') is set at a first value, dc, the internal diameter of the first manufactured component 16a is $D_1$, and the light disc 52' has an area of focus 128 that corresponds to the intersection between the light disc 52' and the internal surface 54 of the first manufactured component 16a. After the first manufactured component 16a has been inspected, the second manufactured component 16b having the internal diameter of $D_2$, which is larger than the internal diameter $D_1$, is then inspected via the inspection device 18'. However, the area of focus 128 of the light disc 52' does not correspond to the intersection between the light disc 52' and the internal surface 54 of the second manufactured component 16b since the distance between the conical mirror 48' and the light source 38' was not adjusted in FIG. 10B relative to FIG. 10A. Therefore, to properly focus the light disc 52' onto the internal surface 54 of the second manufactured component 16b, the distance between the conical mirror 48' and the light source 38' is adjusted (e.g., decreased) to a second value, $d_D$, so that the area of focus 128 of the light disk 52' corresponds to the intersection between the light disc 52' and the internal surface 54 of the second manufactured component 16b. It should be understood that the area of focus 128 could be adjusted by any incremental value to inspect a multitude of manufactured components having internal diameters or profiles of any size and is not limited to the two positions illustrated in FIGS. 10A-10C.

The actuators (i.e., actuator 114 and actuator 124) that are configured to make the adjustments to the to the inspection device 18' to ensure the light disc 52' is in the field of view 36' of the optical probe 32' and to ensure the light disc 52' is focused onto the internal surfaces 54 of the manufactured components 16 may be in communication with and controlled by the controller 28. The actuators (i.e., rotational motor 72 and linear motion slide 76, or alternatively a robot) that are configured to control extending and retracting the optical probe 32, light source 38, and conical mirror 48 into and out of the cavities or orifices 56 defined by the manufactured components 16 between the advanced position 22 and the retracted position 20 during scans or inspections of the internal surfaces 54 of the manufactured components 16 may also be in communication with and controller by the controller 28.

Figure 11:
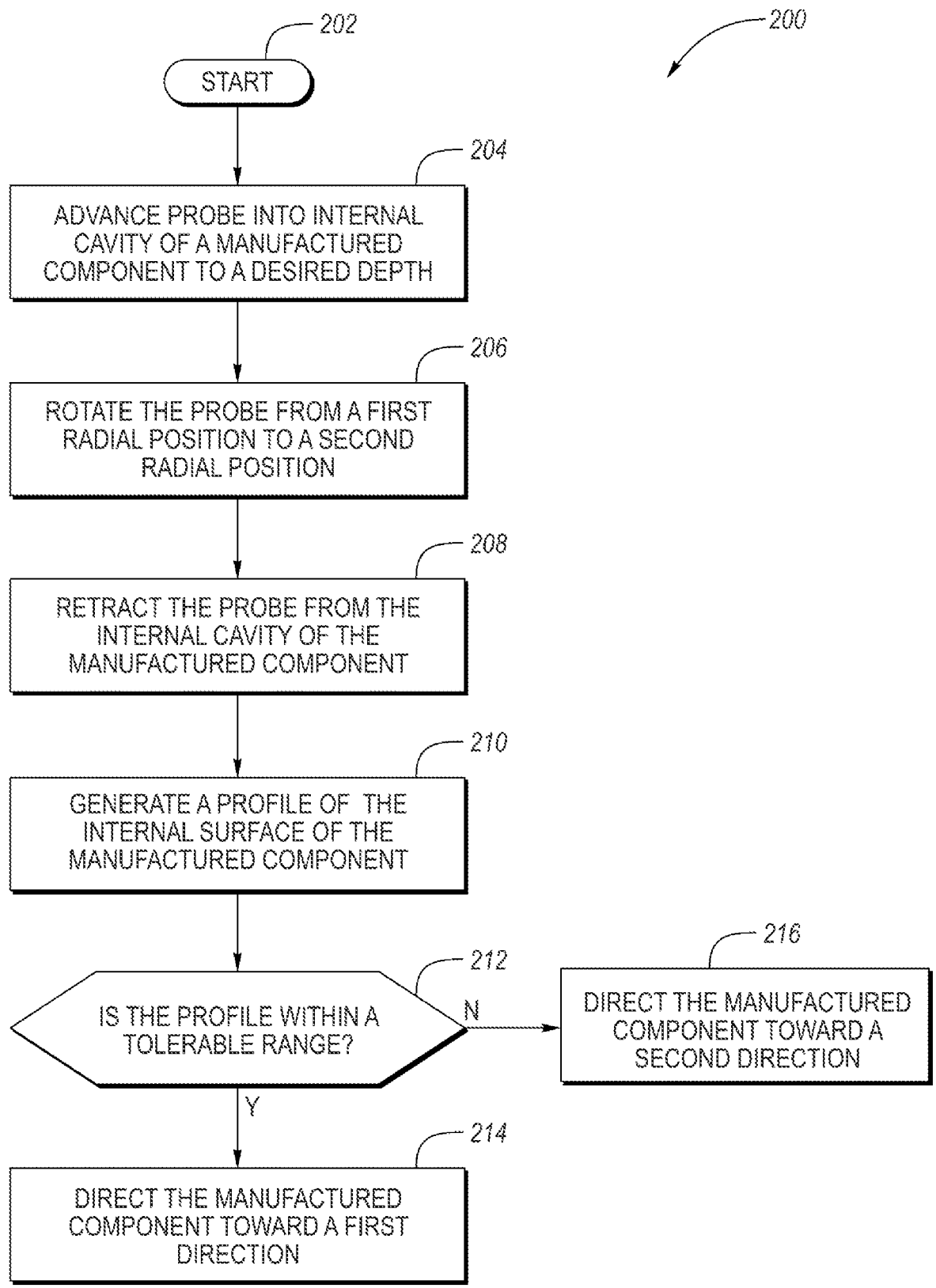
FIG. 11 is a flowchart illustrating a method for controlling the inspection system.
Figure 12A:
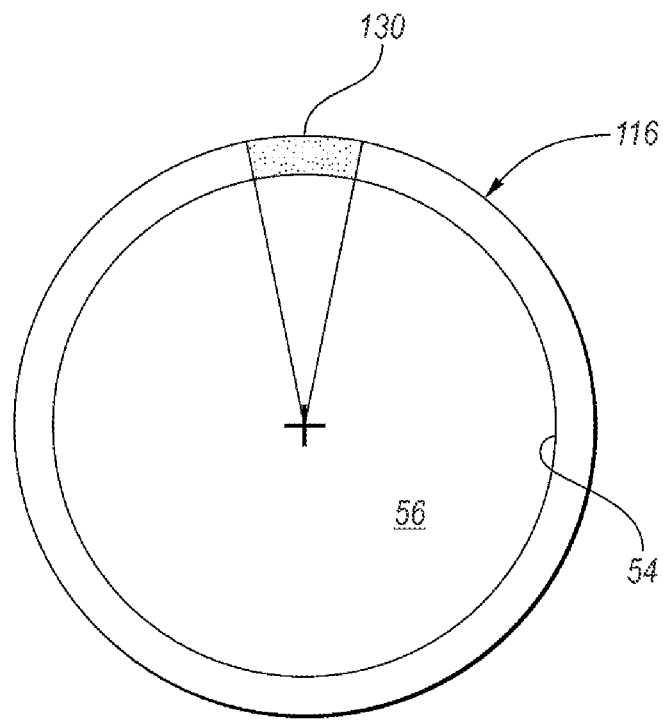
FIGS. 12A and 12B illustrate a field of view of an optical probe of the inspection device.
Figure 12B:
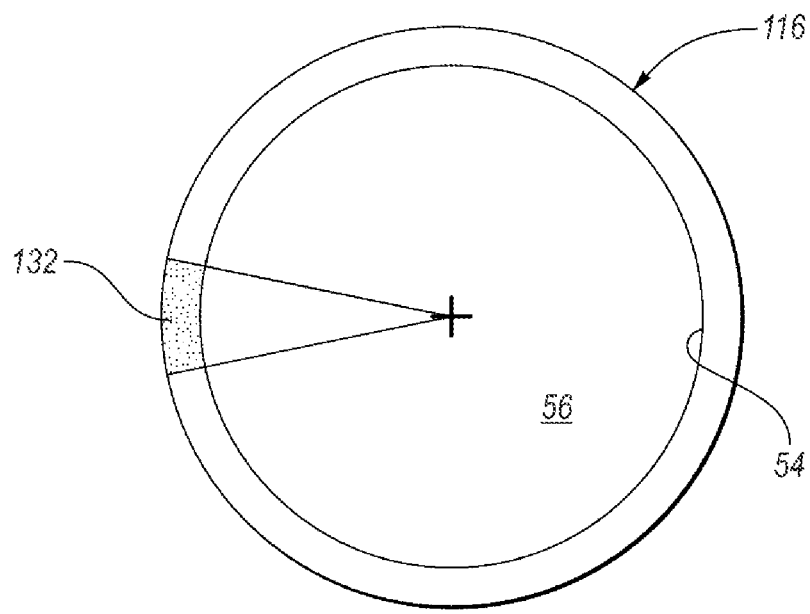

Referring to FIG. 11-12B, a flowchart of a method 200 for controlling the inspection of the manufactured parts 16 via the inspection system 10 and the different positions of the field of view 36 of the optical probe 32 are illustrated. The method 200 may be stored as control logic and/or algorithms within the controller 28. The controller 28 may implement the method 200 by controlling the various actuators of the inspection system 10. The method 200 is initiated at start block 202. The method 200 may be initiation via a manufactured component 16 entering the inspection station 12. The presence of the manufactured component 16 may be detected by proximity sensors, optical sensors, laser sensors, or any other sensor know to one of ordinary skill in the art that is capable of detecting the presence of an object. Such a sensor may then communicate the presence of the manufactured component 16 to the controller 28.

Next, at block 204, the optical probe 32, light source 38, and conical mirror 48 are advanced into the cavity 56 defined by the manufactured component 16 from the retracted position 20 to a desired depth corresponding to the advanced position 22, while the optical probe 32, light source 38, and conical mirror 48 are at a first radial position, to scan and inspect the internal surface 54 of the manufactured component 16. Once the optical probe 32, light source 38, and conical mirror 48 are at the desired depth, the optical probe 32, light source 38, and conical mirror 48 are rotated from the first radial position to a second radial position via an actuator (e.g., rotational motor 72) at block 206 while at the desired depth. The optical probe 32, light source 38, and conical mirror 48 are then retracted while the optical probe 32, light source 38, and conical mirror 48 are at the second radial position at block 208 from the advanced position 22 to the retracted position 20, to further scan and inspect the internal surface 54 of the manufactured component 16. The internal surface 54 of the manufactured component 16 may be continually scanned during the steps at blocks 204, 206, and 208.

If the second embodiment of the inspection device 18' is utilized, at some point before or upon initiation of block 204, the distance between the conical mirror 48' and the optical probe 32' may be adjusted to ensure the light disc 52' is within the field of view 36' and/or the distance between the conical mirror 48' and the light source 38' may be adjusted to ensure the light disc 52' is focused onto the internal surface 54 of the manufactured component 16. Such adjustments may be automatic. Such adjustments may be in response to the imaging sensor 58' not receiving reflections of the light disc 52' from the internal surface 54 or the imaging sensor not receiving focused reflections of the light disc 52' from the internal surface 54.

The bracket 60 any associated wires (or any of the components that extend between the optical probe 32' and the light source 38' if the second embodiment of the inspection device 18' is utilized) may obstruct a first portion 130 of the internal surface 54 of the manufactured component 16 within the field of view 36 of the optical probe 32 while the optical probe 32, light source 38, and conical mirror 48 are in the first radial position (See FIG. 12A). The bracket 60 any associated wires (or any of the components that extend between the optical probe 32' and the light source 38' if the second embodiment of the inspection device 18' is utilized) may obstruct a second portion 132 of the internal surface 54 of the manufactured component 16 within the field of view 36 of the optical probe 32 while the optical probe 32, light source 38, and conical mirror 48 are in the second radial position (See FIG. 12B). The first portion 130 of the internal surface 54 does not overlap the second portion 132 of the internal surface. This lack of overlap ensures that the entire internal surface 54 of the manufactured component 16 is scanned, since the optical probe 32, light source 38, and conical mirror 48 are advanced into the cavity 56 at the first radial position and retracted from the cavity 56 at the second radial position.

During the scan, the reflections of the light disc 52 from the internal surface 54 of the manufactured component 16 are directed to the imaging sensor 58. The reflections of the light disc 52 from the internal surface 54 that are received by the imaging sensor 58 during the scan are compiled to generate a scanned profile of the internal surface 54 or internal features of the manufactured component 16 at block 210. The scanned profile or internal features are then compared to a model profile or model internal features at block 212 to determine if the scanned profile or internal features are within a tolerable range of the model profile or model features, or if there are any defects on the manufactured component 16. If the scanned profile or internal features are within the tolerable range or ranges and there are no defects on the manufactured component 16, the method 200 moves on to block 214 where the manufactured component 16 is directed toward the first direction 24, which is indicative that the manufactured component 16 has "passed" the inspection. If the scanned profile or features are not within the tolerable range or ranges, or if there are defects on the manufactured component 16, the method 200 moves on to block 216 where the manufactured component 16 is directed toward the second direction 26, which is indicative that the manufactured component 16 has "failed" the inspection.

It should be understood that the flowchart in FIG. 11 is for illustrative purposes only and that the method 200 should not be construed as limited to the flowchart in FIG. 11. Some of the steps of the method 200 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An inspection system comprising:
   an optical probe having (i) an end and (ii) a field of view projecting outward from the end;
   a light source (i) spaced apart from the end of optical probe and (ii) positioned within the field of view of the optical probe;
   a conical mirror (i) secured to light source and (ii) configured to transform light emitted from the light source into a light disc, wherein the optical probe, light source, and conical mirror are collectively configured to (i) extend into and retract out of a cavity defined by a manufactured component and (ii) collectively rotate within the cavity to scan an internal surface of the manufactured component, and wherein the light disc is projected onto the internal surface during the scan;
   an imaging sensor configured to receive reflections of the light disc from the internal surface via the optical probe during the scan;
   a first actuator configured to collectively rotate the optical probe, light source, conical mirror, and imaging sensor about an axis;
   a second actuator configured to collectively linearly extend and retract the optical probe, light source, conical mirror, imaging sensor, and first actuator along the axis;
   a third actuator configured to adjust a distance between the conical mirror and the end of optical probe to move an intersection between the light disc and the internal surface of the manufactured component into and of out of the field of view;
   a fourth actuator confirmed to adjust a distance between the conical mirror and the light source to adjust a focus the light disc radially inward and radially outward from the conical mirror; and
   a controller programmed to,
   (i) operate the second actuator to extend the light source, conical mirror, and optical probe along the axis at a first radial position from a retracted position to a desired depth into the cavity, (ii) operate the third actuator to adjust the distance between the conical mirror and the end of the optical probe to move the intersection between the light disc and the internal surface of the manufactured component into the field of view, (iii) operate the fourth actuator to adjust the distance between the conical mirror and the light source to focus the light disc radially relative to the conical mirror and on the internal surface of the manufactured component, (iv) overate the first actuator to rotate the light source, conical mirror, and optical probe about the axis at the desired depth from the first radial position to a second radial position, and (v) operate the second actuator to retract the light source, conical mirror, and optical probe along the axis from the cavity at second radial position during the scan, generate a profile of the internal surface based on the reflections of the light disc from the internal surface received by the imaging sensor during the scan, in response to the profile being within a tolerable range, operate a conveyance system to direct the manufactured component toward a first direction, and in response to the profile being outside of the tolerable range, operate the conveyance system to direct the manufactured component toward a second direction.

2. The inspection system of claim 1, wherein a bracket (i) secures the light source to the optical probe, (ii) extends between the end of the optical probe and the light source, and (iii) partially blocks the field of view.

3. The inspection system of claim 2, wherein (i) a first portion of the internal surface of the manufactured component is obstructed from the field of view via the bracket while the optical probe, light source, and conical mirror are in the first radial position, (ii) a second portion of the internal surface is obstructed from the field of view via the bracket while the optical probe, light source, and conical mirror are in the second radial position, and (iii) the first portion of the internal surface does not overlap the second portion of the internal surface, and wherein the imaging sensor is configured to receive reflections of the light disc from the first and second portions of internal surface via the optical probe during the scan, and wherein the profile of the internal surface generated by the controller is further based on the reflections of the light disc from the first and second portions of the internal surface received by the imaging sensor during the scan.

4. The inspection system of claim 1, wherein the optical probe includes a second light source that directs light through the optical probe such that the light emitted from the second light source is emitted from the end of the optical probe and is configured to illuminate the field of view.

5. The inspection system of claim 4, wherein the light emitted from the light source is laser light and the light emitted from the second light source is non-laser light.

6. An inspection system configured to scan internal surfaces of manufactured components comprising:
an optical probe having a field of view;
a light source (i) spaced apart from an end of the optical probe and (ii) positioned within the field of view of the optical probe;
a bracket securing the light source to the optical probe, wherein the bracket partially blocks the internal surfaces of the manufactured components within the field of view while scanning the internal surfaces;
a conical mirror (i) secured to the light source and (ii) configured to transform light emitted from the light source into a light disc, wherein the light disc is configured to be projected onto the internal surfaces of the manufactured components while scanning the internal surfaces;
an imaging sensor configured to receive reflections of the light disc from the internal surfaces via the optical probe while scanning the internal surfaces;

a first actuator configured to collectively rotate the optical probe, light source, bracket, conical mirror, and imaging sensor about an axis to adjust a radial position of the field of view relative to the internal surfaces of the manufactured components while scanning the internal surfaces;
a second actuator configured to collectively linearly extend and retract the optical probe, light source, bracket, conical mirror, and first actuator along the axis to collectively extend the optical probe, fight source, and conical mirror into and out of cavities defined by the internal surfaces of the manufactured components;
a third actuator configured to adjust a distance between the conical mirror and the end of the optical probe to move the intersection between the light disc and the internal surfaces of the manufactured components into and of out of the field of view; and
a fourth actuator configured to adjust a distance between the conical mirror and the light source to adjust a focus of the light disc radially inward and radially outward from the conical mirror.

7. The inspection system of claim 6, further comprising a controller programmed to, while scanning the internal surfaces:
operate the second actuator to extend the optical probe, light source, bracket, and conical mirror at a first radial position from a retracted position to desired depths into the cavities,
operate the first actuator to rotate the optical probe, light source, bracket, and conical mirror at the desired depths from the first radial position to a second radial position, and
operate the second actuator to retract the optical probe, light source, bracket, and conical mirror from the cavities at second radial position.

8. The inspection system of claim 7, wherein the controller is further programmed to,
generate profiles of the internal surfaces based on the reflections of the light disc from the internal surfaces received by the imaging sensor while scanning the internal surfaces,
in response to the profiles being within a tolerable range, operate a conveyance system to direct the manufactured components toward a first direction, and
in response to the profiles being outside of the tolerable range, operate the conveyance system to direct the manufactured component toward a second direction.

9. The inspection system of claim 8, wherein (i) first portions of the internal surfaces of the manufactured components are obstructed from the field of view via the bracket while the optical probe, light source, bracket, and conical mirror are in the first radial position, (ii) second portions of the internal surfaces are obstructed from the field of view via the bracket while the optical probe, light source, bracket, and conical mirror are in the second radial position, and (iii) the first portions of the internal surfaces do not overlap the second portions of the internal surfaces, and wherein the imaging sensor is configured to receive reflections of the light disc from the first and second portions of internal surfaces via the optical probe while scanning the internal surfaces, and wherein the profiles of the internal surfaces generated by the controller are further based on the reflections of the light disc from the first and second portions of the internal surfaces received by the imaging sensor while scanning the internal surfaces.

10. The inspection system of claim 6, wherein the optical probe includes a second light source that directs light through the optical probe such that the light emitted from the second light source is emitted from the end of the optical probe and is configured to illuminate the field of view.

11. The inspection system of claim 10, wherein the light emitted from the light source is laser light and the light emitted from the second light source is non-laser light.

12. An inspection system configured to scan internal surfaces of manufactured components comprising:
  an optical probe having a field of view;
  a light source (i) spaced apart from the optical probe and (ii) positioned within the field of view of the optical probe;
  a conical mirror (i) secured to the light source and (ii) configured to transform light emitted from the light source into a light disc, wherein the light disc is configured to be projected onto the internal surfaces of the manufactured components while scanning the internal surfaces;
  an imaging sensor configured to receive reflections of the light disc from the internal surfaces via the optical probe while scanning the internal surfaces;
  a first actuator configured to collectively rotate the optical probe, light source, conical mirror, and imaging sensor about an axis;
  a second actuator configured to collectively linearly extend and retract the optical probe, light source, conical mirror, and first actuator along the axis to collectively extend the optical probe, light source, and conical mirror into and out of cavities defined by the internal surfaces of the manufactured components;
  a third actuator configured to adjust a distance between the conical mirror and an end of the optical probe to move the intersection between the light disc and the internal surfaces of the manufactured components into and of out of the field of view; and
  a fourth actuator configured to adjust a distance between the conical mirror and the light source to adjust a focus of the light disc radially inward and radially outward from the conical mirror.

13. The inspection system of claim 12 further comprising a controller programmed to, while scanning the internal surfaces:
  operate the second actuator to collectively extend the optical probe, light source, and conical mirror at a first radial position from a retracted position to desired depths into cavities defined by the internal surfaces of the manufactured components,
  operate the first actuator to collectively rotate the optical probe, light source, and conical mirror at the desired depths from the first radial position to a second radial position, and
  operate the second actuator to collectively retract the optical probe, light source, and conical mirror from the cavities at second radial position.

14. The inspection system of claim 13, wherein the controller is further programmed to,
  generate profiles of the internal surfaces based on the reflections of the light disc from the internal surfaces received by the imaging sensor while scanning the internal surfaces,
  in response to the profiles being within a tolerable range, operate a conveyance system to direct the manufactured components toward a first direction, and
  in response to the profiles being outside of the tolerable range, operate the conveyance system to direct the manufactured components toward a second direction.

15. The inspection system of claim 13, wherein a bracket (i) secures the light source to the optical probe, (ii) extends between an end of the optical probe and the light source, and (iii) partially blocks the field of view.

16. The inspection system of claim 15, wherein (i) first portions of the internal surfaces of the manufactured components are obstructed from the field of view via the bracket while the optical probe, light source, and conical mirror are in the first radial position, (ii) second portions of the internal surfaces are obstructed from the field of view via the bracket while the optical probe, light source, and conical mirror are in the second radial position, and (iii) the first portions of the internal surfaces do not overlap the second portions of the internal surfaces, and wherein the imaging sensor is configured to receive reflections of the light disc from the first and second portions of the internal surfaces via the optical probe while scanning the internal surfaces, and wherein the profiles of the internal surfaces generated by the controller are further based on the reflections of the light disc from the first and second portions of internal surfaces received by the imaging sensor while scanning the internal surfaces.

17. The inspection system of claim 12, wherein the optical probe includes a second light source that directs light through the optical probe such that the light emitted from the second light source is emitted from an end of the optical probe and is configured to illuminate the field of view.

18. The inspection system of claim 17, wherein the light emitted from the light source is laser light and the light emitted from the second light source is non-laser light.

19. An inspection system configured to scan internal surfaces of manufactured components comprising:
  an optical probe having a field of view;
  a light source (i) spaced apart from the optical probe and (ii) positioned within the field of view of the optical probe;
  a conical mirror (i) secured to the light source and (ii) configured to transform light emitted from the light source into a light disc, wherein the light disc is configured to be projected onto the internal surfaces of the manufactured components while scanning the internal surfaces;
  an imaging sensor configured to receive reflections of the light disc from the internal surfaces via the optical probe while scanning the internal surfaces;
  a first actuator configured to collectively rotate the optical probe, light source, conical mirror, and imaging sensor about an axis;
  a second actuator configured to collectively linearly extend and retract the optical probe, light source, conical mirror, and first actuator along the axis to collectively extend the optical probe, light source, and conical mirror into and out of cavities defined by the internal surfaces of the manufactured components;
  a third actuator configured to adjust a distance between the conical mirror and an end of the optical probe to move the intersection between the light disc and the internal surfaces of the manufactured components into and of out of the field of view; and
  a fourth actuator configured to adjust a distance between the conical mirror and the light source to adjust a focus of the light disc radially inward and radially outward from the conical mirror to focus the light disc onto the internal surfaces of the manufactured components.

20. The inspection system of claim 19 further comprising a controller programmed to, while scanning the internal surfaces:

operate the second actuator to collectively extend the optical probe, light source, and conical mirror at a first radial position from a retracted position to desired depths into cavities defined by the internal surfaces of the manufactured components, operate the first actuator to collectively rotate the optical probe, light source, and conical mirror at the desired depths from the first radial position to a second radial position, and operate the second actuator to collectively retract the optical probe, light source, and conical mirror from the cavities at second radial position.

21. The inspection system of claim 20, wherein the controller is further programmed to, generate profiles of the internal surfaces based on the reflections of the light disc from the internal surfaces received by the imaging sensor while scanning the internal surfaces, in response to the profiles being within a tolerable range, operate a conveyance system to direct the manufactured components toward a first direction, and in response to the profiles being outside of the tolerable range, operate the conveyance system to direct the manufactured components toward a second direction.

22. The inspection system of claim 20, wherein a bracket (i) secures the light source to the optical probe, (ii) extends between an end of the optical probe and the light source, and (iii) partially blocks the field of view.

23. The inspection system of claim 22, wherein (i) first portions of the internal surfaces of the manufactured components are obstructed from the field of view via the bracket while the optical probe, light source, and conical mirror are in the first radial position, (ii) second portions of the internal surfaces are obstructed from the field of view via the bracket while the optical probe, light source, and conical mirror are in the second radial position, and (iii) the first portions of the internal surfaces do not overlap the second portions of the internal surfaces, and wherein the imaging sensor is configured to receive reflections of the light disc from the first and second portions of the internal surfaces via the optical probe while scanning the internal surfaces, and wherein the profiles of the internal surfaces generated by the controller are further based on the reflections of the light disc from the first and second portions of internal surfaces received by the imaging sensor while scanning the internal surfaces.

24. The inspection system of claim 19, wherein the optical probe includes a second light source that directs light through the optical probe such that the light emitted from the second light source is emitted from an end of the optical probe and is configured to illuminate the field of view.

25. The inspection system of claim 24, wherein the light emitted from the light source is laser light and the light emitted from the second light source is non-laser light.

26. The inspection system of claim 1 wherein the distance between the conical mirror and the light source is adjustable via the fourth actuator independently relative to an adjustment of the distance between the conical mirror and the end of the optical probe via the third actuator such that (i) adjustment via the fourth actuator and no adjustment via the third actuator adjusts the focus the light disc radially relative to the conical mirror but maintains a position of the light disc relative to the field of view and (ii) adjustment via the third actuator and no adjustment via the fourth actuator adjusts the position of light disc relative to the field of view but maintains the focus the light disc radially relative to the conical mirror.

27. The inspection system of claim 1, wherein the distance between the conical mirror and the end of optical probe and a distance between the light source and the end of the optical probe are collectively adjustable via the third actuator.

28. The inspection system of claim 4 further comprising a second conical mirror (i) secured to the light source and (ii) configured to concentrate the light from the second light source onto the internal surface of the manufactured component.

29. The inspection system of claim 6, wherein the distance between the conical mirror and the end of optical probe and a distance between the light source and the end of the optical probe are collectively adjustable via the third actuator.

30. The inspection system of claim 6, wherein the distance between the conical mirror and the light source is adjustable via the fourth actuator independently relative to an adjustment of the distance between the conical mirror and the end of the optical probe via the third actuator such that (i) adjustment via the fourth actuator and no adjustment via the third actuator adjusts the focus the light disc radially relative to the conical mirror but maintains a position of the light disc relative to the field of view and (ii) adjustment via the third actuator and no adjustment via the fourth actuator adjusts the position of light disc relative to the field of view but maintains the focus the light disc radially relative to the conical mirror.

31. The inspection system of claim 10 further comprising a second conical mirror (i) secured to the light source and (ii) configured to concentrate the light from the second light source onto the internal surfaces of the manufactured components.

32. The inspection system of claim 12, wherein the distance between the conical mirror and the optical probe and a distance between the light source and the optical probe are collectively adjustable via the third actuator.

33. The inspection system of claim 12, wherein the distance between the conical mirror and the light source is adjustable via the fourth actuator independently relative to an adjustment of the distance between the conical mirror and the optical probe via the third actuator such that (i) adjustment via the fourth actuator and no adjustment via the third actuator adjusts the focus the light disc radially relative to the conical mirror but maintains a position of the light disc relative to the field of view and (ii) adjustment via the third actuator and no adjustment via the fourth actuator adjusts the position of light disc relative to the field of view but maintains the focus the light disc radially relative to the conical mirror.

34. The inspection system of claim 17 further comprising a second conical mirror (i) secured to the light source and (ii) configured to concentrate the light from the second light source onto the internal surfaces of the manufactured components.

35. The inspection system of claim 19, wherein the distance between the conical mirror and the optical probe and a distance between the light source and the optical probe are collectively adjustable via the third actuator.

36. The inspection system of claim 19, wherein the distance between the conical mirror and the light source is adjustable via the fourth actuator independently relative to an adjustment of the distance between the conical mirror and the optical probe via the third actuator such that (i) adjustment via the fourth actuator and no adjustment via the third actuator adjusts the focus the light disc radially relative to the conical mirror but maintains a position of the light disc relative to the field of view and (ii) adjustment via the third actuator and no adjustment via the fourth actuator adjusts the position of light disc relative to the field of view but maintains the focus the light disc radially relative to the conical mirror.

37. The inspection system of claim 24 further comprising a second conical mirror (i) secured to the light source and (ii) configured to concentrate the light from the second light source onto the internal surfaces of the manufactured components.

38. The inspection system of claim 7, wherein the controller is further programmed to, while scanning the internal surfaces:
   operate the third actuator to adjust the distance between the conical mirror and the end of optical probe to move the intersection between the light disc and the internal surfaces of the manufactured components into the field of view, and
   operate the fourth actuator to adjust the distance between the conical mirror and the light source to focus the light disc radially relative to the conical mirror and on the internal surfaces of the manufactured components.

39. The inspection system of claim 13, wherein the controller is further programmed to, while scanning the internal surfaces:
   operate the third actuator to adjust the distance between the conical mirror and the end of optical probe to move the intersection between the light disc and the internal surfaces of the manufactured components into the field of view, and
   operate the fourth actuator to adjust the distance between the conical mirror and the light source to focus the light disc radially relative to the conical mirror and on the internal surfaces of the manufactured components.

40. The inspection system of claim 20, wherein the controller is further programmed to, while scanning the internal surfaces:
   operate the third actuator to adjust the distance between the conical mirror and the end of optical probe to move the intersection between the light disc and the internal surfaces of the manufactured components into the field of view, and
   operate the fourth actuator to adjust the distance between the conical mirror and the light source to focus the light disc radially relative to the conical mirror and on the internal surfaces of the manufactured components.

\* \* \* \* \*